United States Patent

Sudau et al.

[11] Patent Number: 5,816,973
[45] Date of Patent: Oct. 6, 1998

[54] FLYWHEEL MASS ARRANGEMENT WITH A PLANETARY GEAR HAVING A FLYWHEEL MASS HAVING A DIA LARGER

[75] Inventors: Jörg Sudau, Niederwerrn; Bernhard Schierling, Kürnach; Hilmar Göbel, Grafenrheinfeld, all of Germany

[73] Assignee: Fichtel & Sachs AG, Schweinfurt, Germany

[21] Appl. No.: 807,484

[22] Filed: Feb. 27, 1997

[30] Foreign Application Priority Data

Mar. 8, 1996 [DE] Germany .................. 196 09 042.3

[51] Int. Cl.$^6$ ............... F16D 13/60; B60K 17/02
[52] U.S. Cl. ............ 475/347; 475/346; 74/574; 192/212
[58] Field of Search ............... 475/344, 345, 475/346, 347; 74/574; 192/212, 213.2

[56] References Cited

U.S. PATENT DOCUMENTS

| | | | |
|---|---|---|---|
| 4,084,810 | 4/1978 | Forsman | 475/154 X |
| 4,800,996 | 1/1989 | Loizeau | 192/212 X |
| 5,349,883 | 9/1994 | Reik et al. | 475/345 |
| 5,570,615 | 11/1996 | Westphal et al. | 74/574 |

FOREIGN PATENT DOCUMENTS

| | | |
|---|---|---|
| 9414314 | 1/1995 | Germany . |
| 2 285 109 | 6/1995 | United Kingdom . |

*Primary Examiner*—Khoi Q. Ta
*Attorney, Agent, or Firm*—Cohen, Pontani, Lieberman & Pavane

[57] ABSTRACT

A flywheel mass arrangement having a flywheel mass on the driving side, a planetary gear unit having at least one planet carrier provided with at least one planet gear that engages with at least one additional toothed wheel of the planetary gear unit, and with a flywheel mass on the driven side which can be rotationally deflected relative to the flywheel mass on the driving side. At least one of the flywheel masses has a control structure for elastic elements of a damping arrangement which act in the circumferential direction. A mass is provided at the planet gear to project radially beyond the toothing diameter of the planet gear and is arranged at an axial offset relative to at least one additional toothed wheel such as the ring gear or the sun gear of the planetary gear unit, in particular relative to the toothing engagement of the additional toothed wheel with the planet gear.

30 Claims, 7 Drawing Sheets

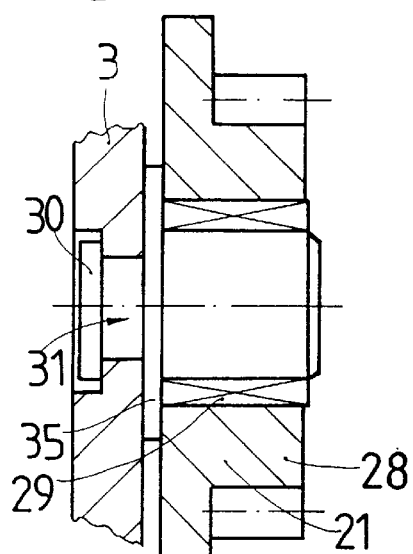
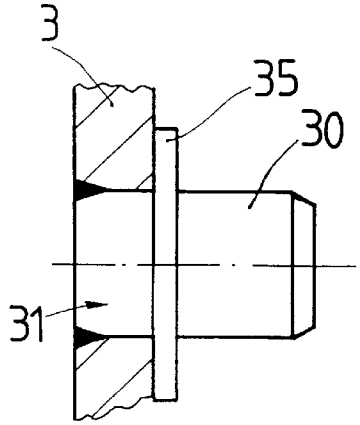
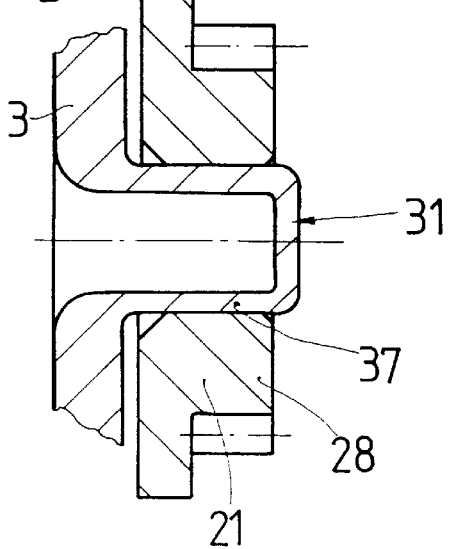
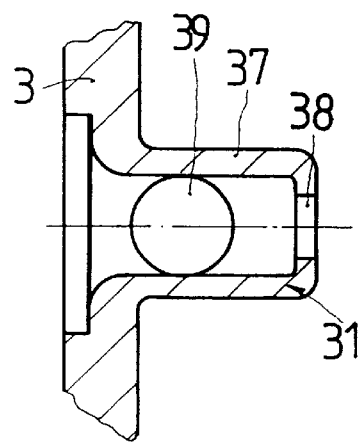

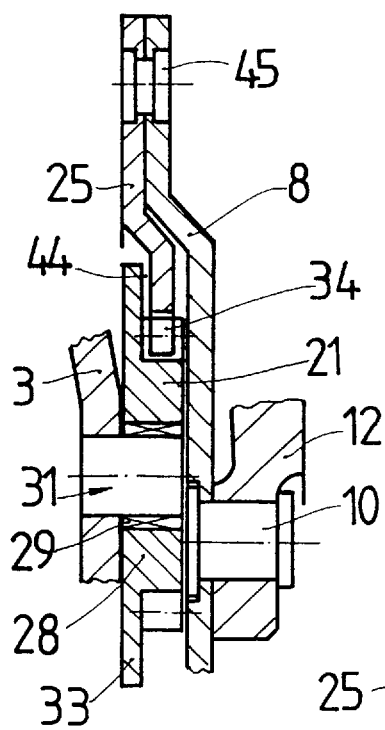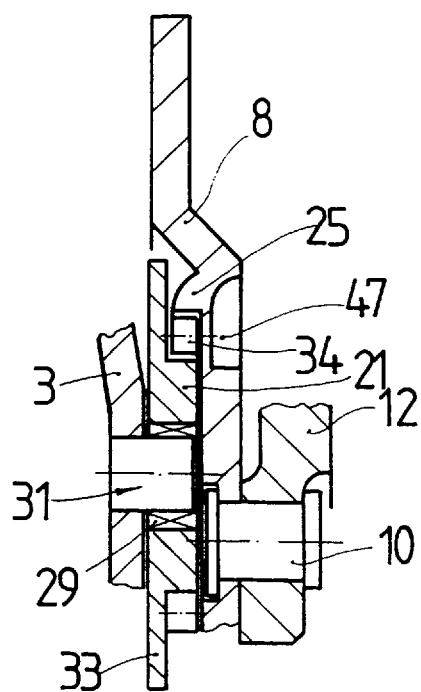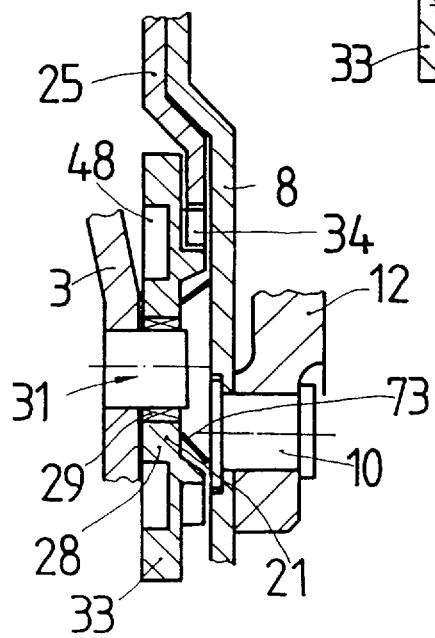

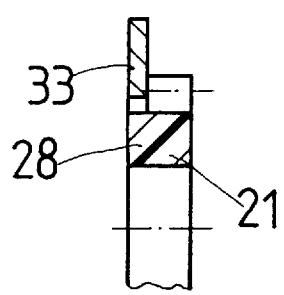
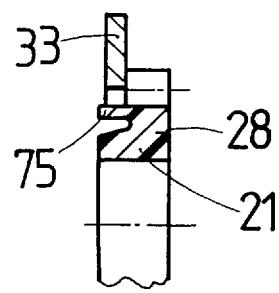
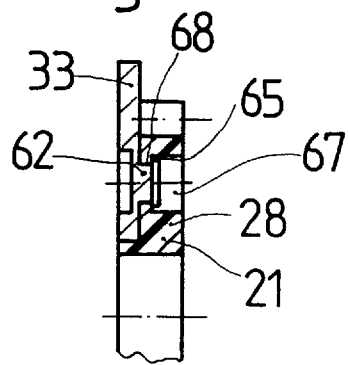
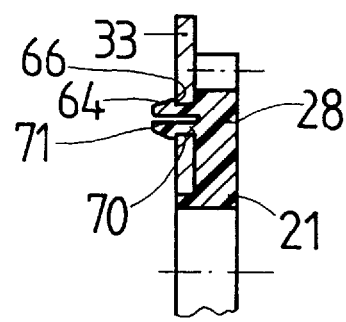
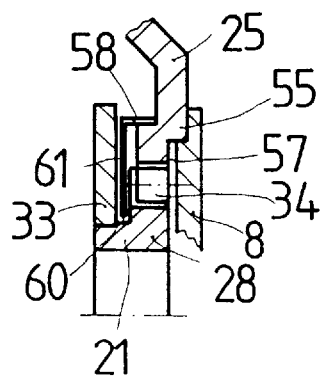

FLYWHEEL MASS ARRANGEMENT WITH A PLANETARY GEAR HAVING A FLYWHEEL MASS HAVING A DIA LARGER

BACKGROUND OF THE INVENTION

1. Field of the Invention

The invention is directed to a flywheel mass arrangement.

2. Description of the Prior Art

DE-GM 94 14 314 discloses a flywheel mass arrangement which is formed with a flywheel mass on the driving side and a flywheel mass on the driven side which can be rotationally deflected relative to the driven side. One of these flywheel masses is provided with controlling means for elastic elements of a damping arrangement that act in the circumferential direction. The elastic elements are supported at their opposite sides on an element of a planetary gear unit, e.g., on a planet carrier or ring gear. In this way, movements of the flywheel mass on the driving side are transmitted to the flywheel mass on the driven side via the planetary gear unit which further comprises planet gears and a sun gear. Thus, torsional oscillations introduced on the driving side are damped before reaching the driven-side flywheel mass.

When a torsional oscillation is introduced, the moment associated with it is divisible through the planetary gear unit, preferably into a first part which attempts to accelerate the driven-side flywheel mass in the same direction as the movement direction of the driving-side flywheel mass determined by the drive and into a second part which, as a result of the planet gears, acts in the opposite direction to that of the moment associated with the introduced torsional oscillation. The two partial moments contact opposing sides of the elastic arrangement which has a deformation constant governed by a deformation moment which is given by the maximum moment that can be introduced by the drive, increased by the gear multiplication factor. Since the sum of the two partial moments acting on the elastic arrangement corresponds to the moment on the driving side, the difference moment is transmitted via the spring arrangement to the driven-side flywheel mass due to the spring constant adapted to the greater deformation moment without leading to increased deformation of the elastic arrangement. As a result, the two flywheel masses execute only a slight rotation relative to one another. This gives approximately the effect of a total mass composed of a driving-side flywheel mass, planetary gear unit and driven-side flywheel mass, so that the mass moment of inertia which opposes the synchronization fluctuations of the drive is apparently increased relative to a flywheel mass arrangement in which greater relative movements between the individual flywheel masses are possible. This leads to a reduction in torque fluctuations at the engine front.

The dynamic resistance generated by the planetary gear unit has considerable bearing on the advantageous operation of the flywheel mass arrangement, and an increased dynamic resistance leads to improved operation. This resistance can be improved, for instance, by increasing the number of toothed wheels in the planetary gear unit and the number of planet gears. However, this improvement is achieved at the cost of increased weight of the flywheel mass arrangement and increased production costs.

SUMMARY OF THE INVENTION

Accordingly, it is an object of the present invention to improve a flywheel mass arrangement of the generic type so that a maximum dynamic resistance can be built up with a minimum number of gear unit elements of a planetary gear unit acting between the flywheel masses.

Pursuant to this object, and others which will become apparent hereafter, one aspect of the present invention resides in a flywheel mass arrangement comprised of a driving side flywheel mass, a driven side flywheel mass that can be rotationally deflected relative to the driving side flywheel mass, and planetary gear means including a toothed wheel and at least one planet carrier having at least one planet gear engaging with the toothed wheel for connecting the driven side flywheel mass with the driving side flywheel mass. A damping arrangement is provided and includes elastic elements. Control means are provided on at least one of the flywheel masses for controlling the elastic elements of the damping arrangement. At least one mass is provided at the planet gear so as to project radially beyond a toothing diameter of the planet gear. The at least one mass is arranged at an axial offset relative to the toothed wheel of the planetary gear means.

By constructing the planet gear with the mass projecting radially beyond its toothing diameter, it is possible to keep the toothing diameter small enough so that a rotational deflection of the ring gear generates a high speed at the planet gear, which requires that a considerable acceleration moment be applied due to the high dynamic resistance. The dynamic resistance is increased even beyond this when, according to the present invention, the mass projects radially beyond the toothing engagement, namely at most to the extent allowed by the available installation space. Moreover, there are further possibilities with respect to the configuration of the mass in that a mass accumulation is provided especially in its circumferential region. A further increase in the mass moment of inertia of the planet gear could include providing a second mass which could be arranged, for example, on the side of the toothed region of the planet gear located opposite to the first mass.

It goes without saying that the dynamic resistance opposing a rotational deflection of the ring gear can be increased by a multiple by forming the flywheel mass arrangement with a plurality of planet gears according to the invention. In accordance with the invention, a further increase could be effected by driving a sun gear which is arranged in a floating manner on the flywheel mass receiving the sun gear, that is, so as to be movable relative thereto, via the planet gears. Of course, when using a sun gear which is supported in this way, the mass also projects beyond the toothing engagement of the sun gear with the planet gear so that the axial offset of the mass relative to the toothing engagement also has considerable importance in this instance.

The dynamic resistance opposing the introduced torsional oscillation can be further increased in that the toothed wheels are surrounded, at least in the region of their meshing engagement, by a viscous medium. The reason for this is that this medium penetrates into the axial region between the mass and the toothed wheels, at a minimum into their meshing engagement. Relative movements between the planet gear, and accordingly the mass, in relation to the ring gear on the one hand and a sun gear on the other hand are hindered by the viscous medium which has penetrated into the aforementioned axial region in that a damping shearing action becomes noticeable. This shearing action increases in strength as the axial distance between the mass and toothing engagement decreases and, when limited to an axial gap, makes up a noticeable proportion of the total dynamic resistance.

A further advantage of the penetration of viscous medium axially between the mass and toothed wheels in that as a result of the adhesion connection brought about by the aforementioned shearing action between the medium and the mass on the one hand and between the medium and the toothed wheels, e.g., the ring gear or sun gear, which are movable relative to the planet gear on the other hand, the driven toothed wheel is driven by the driving toothed wheel even before a positive engagement is produced between the teeth of the two toothed wheels due to play in the toothing engagement. Accordingly, it is prevented in the event of very slight torsional oscillations that a rotational deflection of the respective driven toothed wheel, e.g., the planet gear, by the driving toothed wheel, e.g., the ring gear, can not yet be effected, bringing about an alternating striking against the tooth flank of the toothing engagement associated with the respective movement direction at the other toothed wheel. Accordingly, the present invention not only prevents noises caused by such movement, but also prevents tooth wear caused by the constant striking against the respective tooth flanks. The achieved advantageous effect can be further improved when one of the engaging toothed wheels, preferably the planet gear, is made of plastic at least in the region of its toothing so that a springing or cushioning of the respective teeth of the other toothed wheel and a further noise reduction can be achieved due to the more elastic behavior of plastic teeth compared with teeth made from metal.

According to the present invention, the planet gear is supported at only one projection which is provided at the planet carrier so as to extend away from the planet carrier. This is especially advantageous when only a portion rather than all of the moment flow is directed via the planetary gear unit. The forces which are introduced by the introduction of moments on the planet gear and which act in the radial direction then remain in an order of magnitude which produces virtually no bending at the projection supporting the planet gear in spite of the onesided loading or clamping of this projection. Also, since a second clamping point of the projection is dispensed with, the axial space requirement in the flywheel mass arrangement is very small. There are different possible embodiments of this projection according to the present invention. For example, the projection can be a pin-shaped pressed out portion with a central axis aligned with the rotational axis of the planet gear or a plurality of pressed out portions engaging in the circumferential region of the planet gear. The respective pressed out portion can have a closed constiuction, but it is also possible to form the pressed out portion with a recess which can be used to fill the flywheel mass arrangement with the viscous medium. These recesses can be closed tightly by means of a closing element.

A change in the direction of extension of the central axis of the projection under the influence of the radial forces mentioned above is particularly minimized by the present invention in that an axial stop formed by an enlarged cross section is provided between the planet carrier and the planet gear. As a result of this stop, the radial forces introduced via the planet gear can be transmitted to the planet carrier over a particularly large surface area.

In another embodiment of the invention, for minimizing the axial space requirement of the flywheel mass, the planet gear is held so as to be movable in the axial direction relative to the projection, at least in the direction opposite to the planet carrier. In this way locking means in the axial direction and accordingly the space required for accommodating such locking means can be dispensed with. Instead, the axial relative movement of the planet gear relative to the projection can be limited in that adjacent structural component parts, that are already present in any case, e.g., the flywheel mass on the driven side or a hub part associated therewith, and are secured axially relative to the driving-side flywheel mass by means of a bearing, are brought up to within a gap space from the planet gear. This bringing closer is effected in particular outside of the radial region of the toothing, especially in the bearing region of the planet gear, so as to enable a sufficient quantity of viscous medium to reach the toothing engagement on the one hand and on the other hand so that friction between the planet gear and the adjacent structural component part does not have an effect in the region of the toothing.

Damping of relative movements of the planet gear and the supporting projection can be further improved and an extremely small space requirement can be achieved by providing an axial spring to act on the planet gear.

During the operation of the flywheel mass arrangement, the viscous medium tends, as a result of centrifugal force, to escape outward radially into a region in which the elastic elements of the damping device acting in the circumferential direction are normally arranged, but the medium exits the radial region of the toothing engagement between the toothed wheels so that only limited lubrication remains. In order to solve this problem, more viscous medium could be introduced into the corresponding space so that the radial inner level of the medium shifts inward. However, while this step is advantageous for the lubrication of the tooth engagement, it has the disadvantage of an increased requirement for viscous medium and, as a result, a greater weight of the flywheel mass arrangement. Therefore, according to the present invention, the ring gear is constructed as the outermost toothed wheel of the planetary gear unit such that it defines the radial outer side of a chamber which can be filled with viscous medium. In this way the viscous medium contained therein can be effectively prevented from escaping into regions of the flywheel mass arrangement located farther out, such as the region of the elastic elements of the damper device. According to the invention, this chamber can be sealed radially inside the associated toothing engagement so that when there is a surplus of viscous medium in the chamber the excess medium can escape through the seal. As soon as a determined filling level has been reached in the chamber, an equilibrium takes place so that no further medium can exit from the chamber.

The toothing at the toothed wheels can be advantageously formed by indentations or pressed in portions in that one end face of the respective toothed wheel is acted upon by a pressing die having projections arranged at predetermined distances from one another in the circumferential direction, each projection corresponding to the tooth shape to be formed. By pressing the die into the toothed wheel to be formed, the pressed in portions, by plastic deformation, become projections on the opposite end face of the toothed wheel. In this way, the toothing can be produced without cutting and at the lowest possible cost.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings:

FIG. 2 is a bearing of a planet gear of the planetary gear unit, configured as a riveted pin;

FIG. 3 is a view as in FIG. 2, but with a welded-in pin;

FIG. 4 is a view as in FIG. 2, but with a pressed out portion for receiving the planet gear;

FIG. 5 is a view as in FIG. 4, but with a recess and a locking element in the pressed out portion;

FIG. 7 shows a toothing engagement of the planet gear with the ring gear, wherein the ring gear is connected with a hub part of a flywheel mass;

FIG. 8 is a view as in FIG. 7, but with a ring gear formed by pressed in portions at the hub part;

FIG. 9 is a view as in FIG. 7, but with a toothing formed by pressed in portions at the planet gear;

FIG. 14 shows placement of a mass upon an annular region of the planet gear;

FIG. 15 is a view as in FIG. 14, but with elastic support of the mass at the annular region;

FIG. 16 is a view as in FIG. 15, but with the support extending in a different direction;

FIG. 17 illustrates connection of the annular region of the planet gear with the mass by means of a through-pressing at the mass;

FIG. 18 illustrates construction of a seal in the region of the toothing engagement between the ring gear and planet gear.

DETAILED DESCRIPTION OF THE PREFERRED EMBODIMENTS

Figure 1:
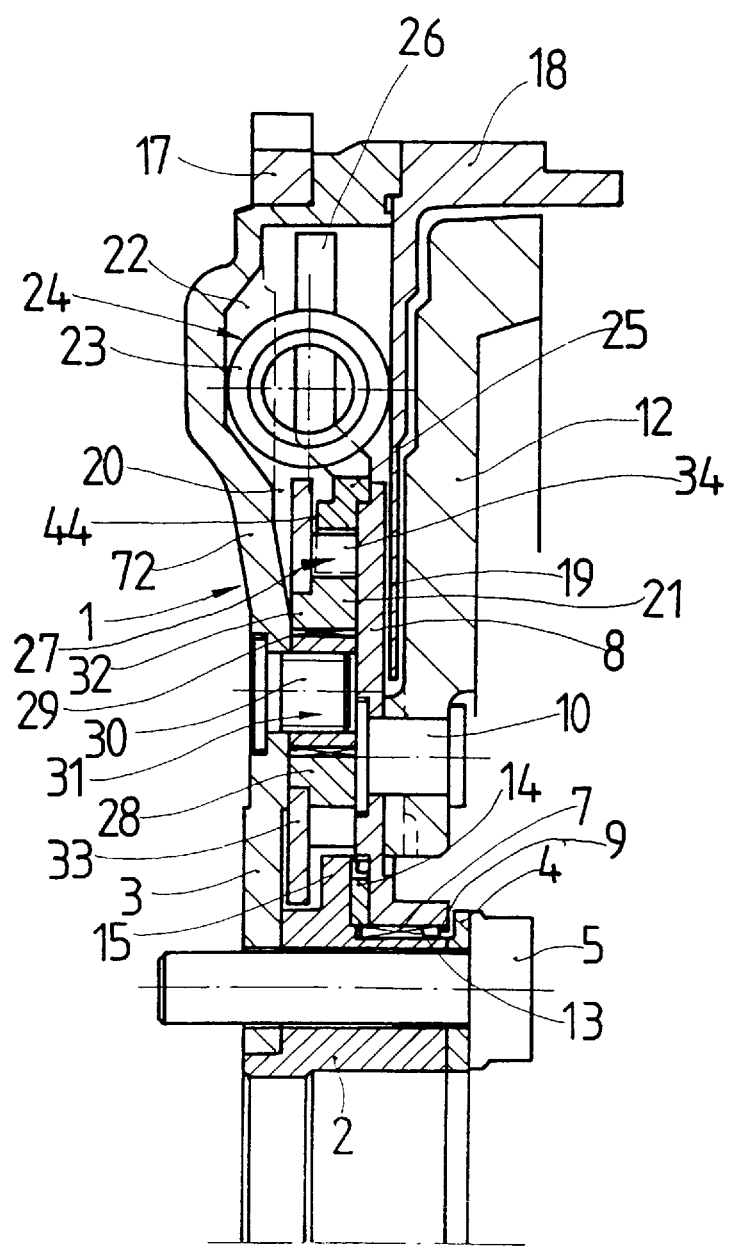
FIG. 1 is a longitudinal section through a half-illustration of a flywheel mass arrangement with a planetary gear unit, pursuant to the present invention.

FIG. 1 shows a flywheel mass arrangement with a first flywheel mass 1 which has a primary flange 3 running outward radially from a crankshaft (not shown) of an internal combus tion engine. A hub 2 centers the primary flange 3, and a retaining plate 4 is mounted on the side of the hub 2 remote of the primary flange 3 and serves, in turn, as a contact for fastening means 5 for connecting the flywheel mass arrangement to the engine crankshaft mentioned above. On its outer side, the hub 2 carries a bearing arrangement 7 which serves to receive a hub part 8 of a flywheel mass 12 on the driven side. The hub part 8 is fastened to the flywheel mass 12 via rivets 10. A shoulder 9 is formed at the radial inner end of the hub part 8 for the purpose of axially securing the hub part 8 and thus the flywheel mass 12 on the driven side. The shoulder 9 contacts a side of the bearing 7 arrangement, more particularly the side of a radial bearing 13. The hub part 8 is supported by its side remote of the shoulder 9 on a radial projection 15 of the hub 2 via an axial bearing 14 of the bearing arrangement 7. The hub part 8 is prevented from departing axially from the axial bearing 14 in the operating state by a pretensioning force acting in the direction of the axial bearing 14. This force is delivered by the contact-pressure spring of a friction clutch (not shown) of conventional design which is to be fastened to the flywheel mass 12 on the driven side.

The primary flange 3, which was already mentioned above, carries a toothed rim 17 in its circumferential area. A starter pinion, not shown, can engage with this toothed rim. Viewed in the axial direction, a cover plate 18 is fastened to the primary flange 3 and projects radially inward between the hub part 8 and the driven-side flywheel mass 12 and acts as a seal 19 to prevent the escape of viscous medium from a space 20 enclosed by the primary flange 3 on one side and by the cover plate 18 on the other side.

Control elements 22 are provided on the side of the primary flange 3 facing the space 20. These control elements 22 act on elastic elements 23 of a damping arrangement 24 which extend in the circumferential direction. The elastic elements 23 are supported at the other end at fingers 26 of a ring gear 25 of a planetary gear unit 27 which project out radially. The ring gear 25 has a toothing engagement 34 with at least one planet gear 28 which is rotatably mounted via a needle bearing 29 on a pin 30 fastened in the primary flange 3. The pin 30 acts as a projection 31 for receiving the planet gear 28. The primary flange 3, as was described, acts as a planet carrier 72.

The planet gear 28 has an annular region 21 in which a step 32 is formed that carries a mass 33. The mass 33 is fastened to the step 32 by welding in the region of connection with the step 32. The mass 33 projects radially substantially beyond the diameter of the toothing engagement 34 and extends almost to the elastic elements 23 in the radial outer region of the driving-side flywheel mass 1 and up to the hub 2 in the radial inner region of the flywheel mass 1.

As will be seen more clearly from FIG. 7, an axial gap 44 remains axially between the toothing engagement 34 of the ring gear 25 with the planet gear 28 and the mass 33. Viscous medium which is contained in the space 20 (FIG. 1) can penetrate into this axial gap 44.

The operation of the flywheel mass arrangement will now be described. When torsional oscillations are introduced on the driving-side flywheel mass 1, the mass 1 causes a deformation of the elastic elements 23 via the control elements 22. The elastic elements 23 in turn provide for a rotational deflection of the ring gear 25 which is connected by welding with the driven-side hub part 8 in the circumferential region of the hub part 8. The planet gear 28 and accordingly the mass 33 which is fixed with respect to rotation relative thereto are set in rotation about the axis of the pin 30 by the rotational deflection of the ring gear 25. In order to damp torsional oscillations proceeding from the crankshaft as far as possible, it is attempted to oppose the highest possible dynamic resistance to this torsional oscillation. For this purpose, the toothing diameter of the planet gear 28 is brought as close as possible to the rotational axis of the planet gear 28, on the one hand, so that a movement of the ring gear 25 causes a relatively high rate of rotation of the planet gear 28 and accordingly a sharp acceleration of same, but, on the other hand, a very great inertia is imparted to the planet gear 28 by means of the mass 33 which is guided far out radially so that a considerable torque is required for its acceleration. This high dynamic resistance which is achieved by mechanical steps is supplemented by a hydraulic damping action which is achieved by the shearing action of the viscous medium in the following manner: viscous medium which has penetrated into the axial gap 44 between the mass 33 and the toothing engagement 34 adheres to the side of the ring gear 25 facing the mass 33 on the one hand and to the end face of the mass 33 facing the ring gear 25 on the other hand. Due to the comparatively large diameter of the ring gear 25 and the high speed of the planet gear 28, there exist between the two aforementioned end faces of mass 33 and ring gear 25 substantial relative velocities which lead to a speed-dependent damping action due to the adhesion effect of the viscous medium. A further advantageous effect of this axial gap 44 is that a very small rotational movement of the ring gear 25 still within the order of magnitude of the range of play between the teeth of the ring gear 25 and the planet gear 28 in the toothing engagement 34, due to the adhesion effect of the viscous medium relative to the respective end face of the ring gear 25 and the mass 33, already results in a driving of the ring gear 25 and the mass 33 and, accordingly, the planet gear 28 when there is still no mechanical connection between the teeth of the ring gear 25 and the planet gear 28 because of the play mentioned above. Consequently, when very slight torsional oscillations are introduced, e.g., during high-speed highway driving, it can be prevented that a tooth of one of the toothed wheels 25, 28 alternately strikes one of the adjacent teeth of the other respective toothed wheel and accordingly causes tooth wear over the long term. This step is reinforced further in that the planet gear 28 is formed of plastic at least in its toothing region so that when two teeth strike against one another, insofar as this should come about in spite of the damping action of the viscous medium in the axial gap 44, this is effected in a highly damped manner due to the flexible characteristic of the tooth material. Constructions of a planet gear 28 whose toothing is formed of plastic are illustrated in FIGS. 14 to 17, which will be discussed at greater length hereinafter. To conclude these remarks concerning the subject of hydraulic damping by means of the viscous medium it should be noted that the damping behavior can be influenced by the dimensioning of the width of the axial gap 44 as much as by the selection of the viscous medium itself. Of course, the damping effect is increased by narrowing the axial gap 44.

When a rotation is introduced into the planet gear 28, radial forces act upon the projection 31. In order to realize a compact and economical construction of the flywheel mass arrangement, this projection 31 is only supported on one side, as is shown in FIG. 1, wherein a movement of the planet gear 28 is defined in the axial direction by the primary flange 3 on one side and by the hub part 8 on the other side. Advantageous constructions of the projection 31 are shown in FIGS. 2 to 5 for preventing a loosening of the projection 31 under the influence of the radial forces and accordingly a deficient guiding of the planet gear 28. In accordance with FIG. 2, an axial stop 35 with a considerably larger radial diameter than the pin 30 is provided at the pin. When radial forces are introduced into the planet gear 28, this axial stop 35 ensures that the bending force to be absorbed by the projection 31 is distributed to the primary flange 3 over a large surface area. The surface-area pressing in the contact region between the pin 30 and the primary flange 3 is accordingly reduced. This is also the aim of the construction according to FIG. 3 in which the diameter is increased by an increase in the diameter of the pin 30 in the area of contact with the primary flange 3 and the contacting surface-area pressing is accordingly reduced. A weld which connects the primary flange 3 with the pin 30 further increases stability.

According to the construction shown in FIG. 4, the projection 31 is formed by a pressedout portion 37 of the primary flange 3. For this purpose, a pressing mandrel is applied to the side of the primary flange 3 remote of the hub part 8 and the material of the primary flange 3 is pressed out in the direction of the planet gear 28 at this location. This causes a peg-like formation which serves to receive the planet gear 28. Due to the fact that the projection 31 and primary flange 3 are formed of one piece, the stability against bending under the influence of the radial forces acting on the planet gear 28 is relatively high. FIG. 5 shows another construction of a pressed out portion 37 of this kind which has a recess 38 at the side facing the hub part 8. The recess 38 can be caused by manufacture, but may also be provided as a deliberate design so that viscous medium can be introduced into the space 20 at this location. To prevent viscous medium from escaping from the space 20, the recess 38 is sealed by a closing element 39, e.g., in the form of a ball which is inserted in the hollow space of the pressed out portion 37. It is also possible to carry out the seal by means of a closing cap, not shown.

Figure 6:
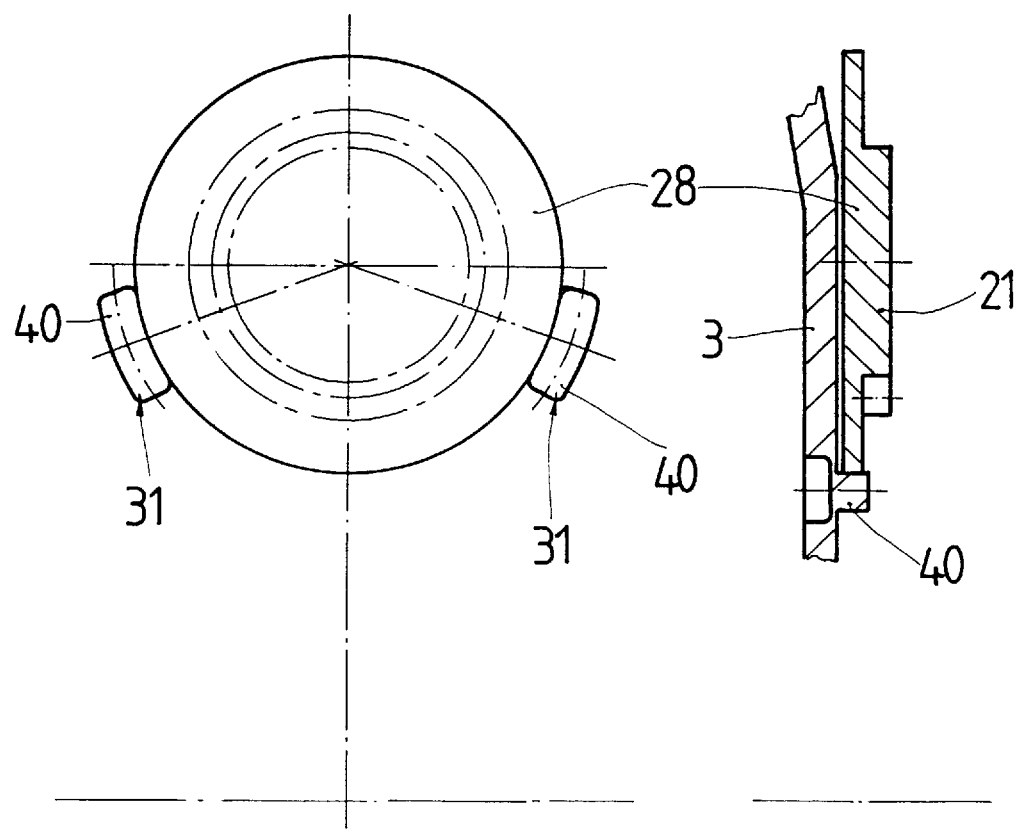
FIGS. 6 show a plurality of pressed out portions acting at the outer circumference of the planet gear.
Figure 10:
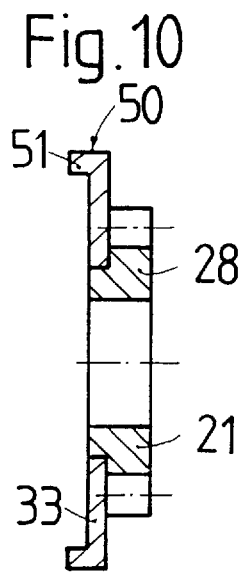
FIG. 10 shows a planet gear with an annular mass accumulation at the outer diameter.

FIG. 6 show a construction in which a plurality of projections 31 are provided in the form of pressed out portions 40, namely in the circumferential region of the mass 33 of the planet gear 28. As in the construction according to FIGS. 4 and 5, the pressed out portions 40 are carried out proceeding from the side of the primary flange 3 remote of the hub part 8.

FIG. 7 shows a construction of the driven-side flywheel mass which is particularly economical with respect to material and cost in that the ring gear 25 is stabilized by axial contact and fastening at the hub part 8. The hub part 8 is in turn stabilized by contact and fastening at the flywheel mass 12. The ring gear 25 may be fastened to the hub part 8 by rivets 45 as shown in FIG. 7, but can also be fastened by welding.

FIG. 8 shows a further simplified construction of the ring gear 25 in which an indentation or pressed-in portion 47 is produced in the hub part 8 by means of a pressing tool, not shown, on the side of the hub part 8 remote of the primary flange 3. The indentation 47 is located on the circumference where a tooth of the ring gear 25 is to be provided on the side of the hub part 8 facing the planet gear 28. In this way, the toothing of the ring gear 25, which is again constructed in one piece with the hub part 8, can be produced without cutting.

FIG. 9 shows the planet gear 28 in which the toothing is formed by pressed in portions 48. These pressed in portions 48 are carried out from the side of the planet gear 28 remote of the ring gear 25 and cause teeth to be pressed out on the opposite side of the planet gear 28. An axial spring 73 is arranged between the hub part 8 and the planet gear 28 to axially hold the planet gear 28 in frictional contact at a supporting location.

Figure 12:
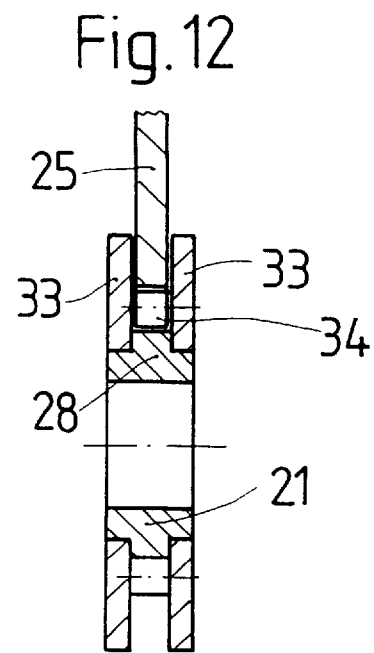
FIG. 12 illustrates formation of the planet gear with two masses.
Figure 11:
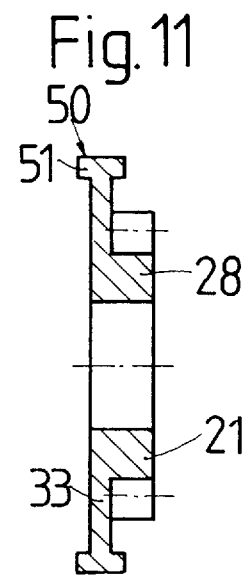
FIG. 11 is a view as in FIG. 10, but with another construction of the mass accumulation.
Figure 13:
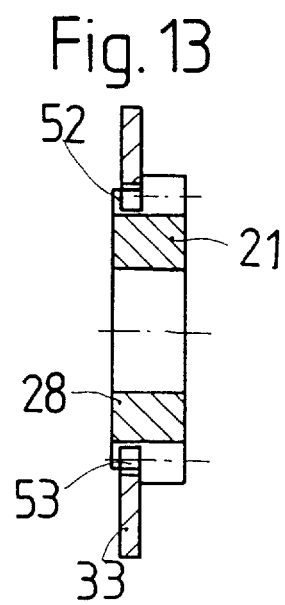
FIG. 13 illustrates connection of a mass with the planet gear by pressing.

FIGS. 10 to 17 show various embodiments of the planet gear 28 involving either the construction of the mass 33 or the fastening of the mass to the annular region 21 of the planet gear 28. According to FIG. 10, the mass 33 is welded with the annular region 21 of the planet gear 28 and has, in the radial outer region, a mass concentration 50 in the form of a ring 51 extending axially in one direction for the purpose of increasing the moment of inertia. According to FIG. 11, the ring 51 projects axially in both directions beyond the remaining portion of the mass 33 which is constructed in one piece with the annular region 21 of the planet gear 28. FIG. 12 shows a planet gear 28 in which a mass 33 is connected in each instance with the annular region 21 on both sides of the toothing engagement 34 with the ring gear 25 by welding. According to FIG. 13, the annular region 21 of the planet gear 28 has a toothing 52 in the working region of the mass 33. The mass 33 has a corresponding toothing 53 that engages in the toothing 52.

After this toothing engagement is produced, the two elements 21 and 33 are securely connected with one another by a press fit.

In contrast to the planet gears 28 according to FIGS. 10 to 13 in which the annular region 21 is made from metal, FIGS. 14 to 17 show a region 21 made of plastic. Thus, the toothing is also made from this material. On the other hand, the mass 33 is still formed of metal.

According to FIG. 14, the mass 33 is placed on the annular region 21 of the planet gear 28 in a frictional engagement. According to FIG. 15, the area pressure for producing the frictional engagement is generated in that a protuberance 75 which is pretensioned outward in the radial direction secures the mass 33 at the annular region 21 of the planet gear 28. With respect to the construction according to FIG. 16, the mass 33 is secured by an expanding element 64 which extends through a bore hole 70 of the mass 33. After passing through the bore hole 70, the expanding element 64 widens so that the arms 71 of the element 64 engage behind a contact face 66 at the side of the mass 33 remote of the annular region 21. In the construction according to FIG. 17, a through-pressed member 62 is formed at the mass 33 from the side of the mass 33 remote of the annular region 21 in the direction of a bore hole 67 in the annular region 21. By introducing an opposing force via the bore hole 67, the free end of the through-pressed member 62 engages in the manner ol a rivet head behind a contact surface 65 in a radial narrowed portion 68 in comparison to the rest of the region of the bore hole 67.

Figure 19:
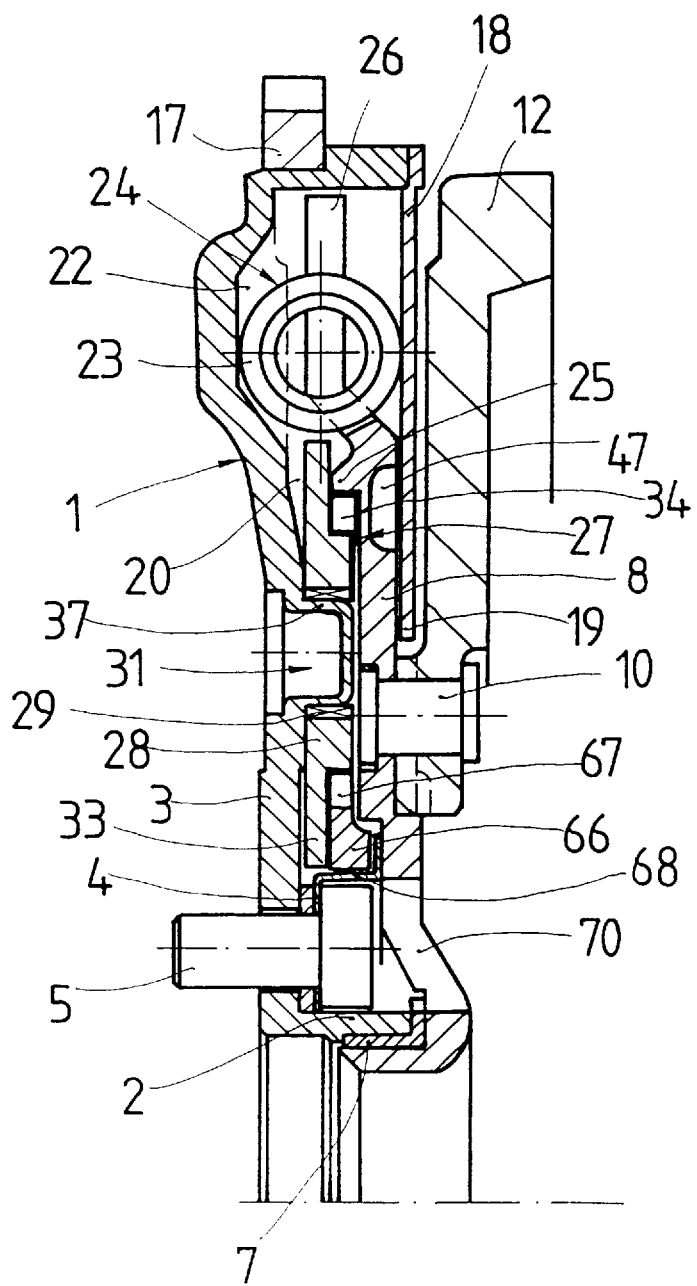
FIG. 19 is a view as in FIG. 1, but with a second toothing engagement with a sun gear supported in a floating manner.

FIG. 19 shows a flywheel mass arrangement in which, in substantial contrast to that shown in FIG. 1, a sun gear 66 is provided which engages with the planet gear 28 via a toothing engagement 67. The sun gear 66 is supported in a floating manner on a sealing plate 68 which is held in contact with the retaining plate 4 by the fastening means 5. The purpose of the sun gear 66 is to further increase the dynamic resistance mentioned in the introductory part of the specification during the occurrence of torsional oscillations, since the sun gear 66 must also be driven in addition to the planet gear 28.

In order to have access to the fastening means 5 in this construction of the flywheel mass arrangement, the hub part 8 is provided with a mounting opening 70 in the region of one of these fastening means 5. Due to its construction with the projection 31, the primary flange 3 acts as the planet carrier 72 for the planet gear 28.

When the space 20 of the driving-side flywheel mass 1 is filled with viscous medium, this viscous medium is conveyed outward radially during operation due to the effect of centrifugal force so that there may he a risk that the toothing engagement 34 between the ring gear 25 and the planet gear 28 would have to work with insufficient viscous medium acting as lubricant. In order to avoid filling the space 20 with viscous medium to the extent that it covers the radial region of the toothing engagement 34 in every case, the step according to FIG. 18 has proven advantageous. According to this step, a formed on portion 55 which extends in the direction of the hub part 8 is provided at the ring gear 25 and defines the radial outer side of a chamber 57 formed axially between the hub part 8, the ring gear 25 and the planet gear 28. Accordingly, viscous medium contained in the chamber 57 can not escape outward into the space 20. However, in the event that the chamber 57 should be overfilled with viscous medium, it is possible for the viscous medium to exit the chamber 57 after axial displacement at the toothing engagement 34 through an annular gap 60 of a noncontacting seal 58. The annular gap 60 is located radially inside the toothing engagement 34. As soon as the chamber 57 is filled with the ideal amount of viscous medium, the viscous medium ceases to exit via the annular gap 60. The noncontacting seal 58 is formed by a plate 61 fastened to the ring gear 25. This plate 61 extends at an axial distance from the mass 33, on the one hand, and from the toothing engagement 34, on the other hand, until its radial inner end approaches the annular region 21 of the planet gear 28 so as to leave a gap.

The invention is not limited by the embodiments described above which are presented as examples only but can be modified in various ways within the scope of protection defined by the appended patent claims.

We claim:

1. A flywheel mass arrangement comprising: a driving side flywheel mass; a driven side flywheel mass which can be rotationally deflected relative to the driving side flywheel mass; planetary gear means including a toothed wheel and at least one planet carrier having at least one planet gear engaging with the one toothed wheel, for connecting the driven side flywheel mass with the driving side flywheel mass: a damping arrangement including elastic elements; control means, provided on at least one of the flywheel masses, for controlling the elastic elements of the damping arrangement; and at least one mass provided at the planet gear so as to project radially beyond a toothing diameter of the planet gear, the mass being arranged at an axial offset relative to the toothed wheel of the planetary gear means.

2. A flywheel mass arrangement according to claim 1, wherein the mass is axially offset relative to a toothing engagement of the toothed wheel and the planet gear.

3. A flywheel mass arrangement according to claim 2, wherein a sealed space is formed by the mass, the driving side flywheel mass and the toothed wheel, a viscous medium being arranged in the sealed space, the mass and the toothed wheel having a maximum magnitude so that when the toothing engagement is arranged within a filling zone of the sealed space containing the viscous medium. an adhesion connection can be produced between the mass and the toothed wheel by the viscous medium, the adhesion connection having a strength that increases as a magnitude of the axial offset is reduced.

4. A flywheel mass arrangement according to claim 1, wherein the toothed wheel is a sun gear, the sun gear being arranged and being centered on the driving side flywheel mass so as to be rotatable relative to the driving side flywheel mass.

5. A flywheel mass arrangement according to claim 1, and further comprising a projection mounted on the planet carrier so as to project away therefrom, the planet gear being mounted on the projection.

6. A flywheel mass arrangement according to claim 5, wherein the projection is configured as a peg-like pressed-out portion of the planet carrier that projects in a direction of the planet gear, the pressed-out portion having an axis aligned with a rotational axis of the planet gear.

7. A flywheel mass arrangement according to claim 6, wherein the pressed-out portion is formed with a recess, and further comprising means for closing the recess in a sealing manner.

8. A flywheel mass arrangement according to claim 5, wherein the projection is configured as a pressed-out portion of the planet carrier, the pressed-out portion being arranged to extend in a direction of the planet gear and so as to be in a circumferential region of the planet gear.

9. A flywheel mass arrangement according to claim 5, wherein the planet gear is supported on the projection so as to be axially movable relative to a planet carrier direction opposite the projection.

10. A flywheel mass arrangement according to claim 5, and further comprising an axial stop mounted on the projection so as to be between the planet carrier and the planet gear.

11. A flywheel mass arrangement according to claim 9, wherein the driven side flywheel mass is arranged so as to define the axial movement of the planet gear relative to the projection, the driven side flywheel mass being arranged at a set distance from the planet gear.

12. A flywheel mass arrangement according to claim 11, wherein the driven side flywheel mass includes a hub part, the hub part being configured so as to define the axial movement of the planet gear.

13. A flywheel mass arrangement according to claim 1, wherein the planet gear is arranged so that an axial gap is formed between the mass and the driven side flywheel mass, the axial gap exceeding an axial spacing in a bearing region of the planet gear.

14. A flywheel mass arrangement according to claim 12, and further comprising bearing means for connecting the driven side flywheel mass with the driving side flywheel mass, the hub part of the driven side flywheel mass being connected to the bearing means.

15. A flywheel mass arrangement according to claim 13, wherein the driven side flywheel mass includes a hub part, the axial gap being formed between the mass and the hub part, and further comprising bearing means for connecting the driven side flywheel mass with the driving side flywheel mass, the hub part of the driven side flywheel mass being connected to the bearing means.

16. A flywheel mass arrangement according to claim 1, and further comprising an axial spring arranged between the driven-side flywheel mass and the planet gear so as to hold the planet gear in frictional contact at a supporting location.

17. A flywheel mass arrangement according to claim 1, wherein the toothed wheel is a ring gear that is in toothed engagement with the planet gear, the ring gear, in a region radially outside the toothed engagement with the planet gear, having an annular portion formed so as to extend toward the driven-side flywheel mass so that the annular portion and the drivenside flywheel mass define a chamber containing viscous medium.

18. A flywheel mass arrangement according to claim 17, and further comprising means for sealing the chamber, the sealing means having an annular gap radially inside the toothing engagement of the ring gear and the planet gear.

19. A flywheel mass arrangement according to claim 1, wherein the driven-side flywheel mass includes a toothing for a toothing engagement with the planet gear, the toothing of the flywheel mass being formed by one of indentations and pressed-in portions which proceed from a side of the flywheel mass remote of the planet gear.

20. A flywheel mass arrancment according to claim 1, wherein the planet gear has a toothing formed by pressed-in portions which proceed from a side of the mass of the planet gear.

21. A flywheel mass arrangement according to claim 1, wherein the mass is configured so as to have a mass concentration at a radially outer region of the planet gear.

22. A flywheel mass arrangement according to claim 21, wherein the mass concentration is configured as a ring arranged to enclose a remainder of the mass.

23. A flywheel mass arrangement according to claim 1, wherein a toothing is formed on the mass, the planet gear having an annular toothed region, the toothing of the mass engaging with the annular toothed region of the planet gear so as to fasten the mass to the planet gear.

24. A flywheel mass arrangement according to claim 1, wherein the planet gear has a plastic toothing.

25. A flywheel mass arrangement according to claim 24, wherein the planet gear has an annular toothed region formed of plastic, the mass being held at the annular toothed region of the planet gear by radially directed pretensioning.

26. A flywheel mass arrangement according to claim 25, and further comprising a protuberance formed at the annular toothed region of the planet gear so as to be pretensioned in a radial direction, the protuberance being configured to hold the mass.

27. A flywheel mass arrangement according to claim 24, and further comprising an extending projection formed on an annular region of the planet gear so as to engage behind a contact surface of the mass.

28. A flywheel mass arrangement according to claim 24, wherein a substantially axially extending projection is provided on the mass so as to engage behind a contact surface of an annular region of the planet gear.

29. A flywheel mass arrangement according to claim 28, wherein the annular region of the planet gear has a bore hole, the projection formed on the mass being pressed through the bore hole and having a rivet-head-shaped free end that engages behind the contact surface.

30. A flywheel mass arrangement according to claim 27, wherein the mass has a bore hold therein, the projections being configured as split arms which are pretensioned at right angles to the bore hole axis, the arms being inserted in the bore hole of the mass so as to engage behind the contact surface.

* * * * *